United States Patent
Chae et al.

(10) Patent No.: US 10,567,032 B2
(45) Date of Patent: Feb. 18, 2020

(54) METHOD AND DEVICE FOR TRANSMITTING/RECEIVING SIGNALS RELATED TO CHANGE OF TX/RX CAPABILITY IN FDR SYSTEM

(71) Applicant: LG ELECTRONICS INC., Seoul (KR)

(72) Inventors: Hyukjin Chae, Seoul (KR); Suckchel Yang, Seoul (KR); Jonghyun Park, Seoul (KR)

(73) Assignee: LG ELECTRONICS INC., Seoul (KR)

(*) Notice: Subject to any disclaimer, the term of this patent is extended or adjusted under 35 U.S.C. 154(b) by 0 days.

(21) Appl. No.: 15/774,853

(22) PCT Filed: Nov. 10, 2016

(86) PCT No.: PCT/KR2016/012936
§ 371 (c)(1),
(2) Date: May 9, 2018

(87) PCT Pub. No.: WO2017/082650
PCT Pub. Date: May 18, 2017

(65) Prior Publication Data
US 2018/0248581 A1 Aug. 30, 2018

Related U.S. Application Data

(60) Provisional application No. 62/253,140, filed on Nov. 10, 2015, provisional application No. 62/253,141, filed on Nov. 10, 2015.

(51) Int. Cl.
*H04L 5/14* (2006.01)
*H04B 1/56* (2006.01)

(52) U.S. Cl.
CPC . *H04B 1/56* (2013.01); *H04L 5/14* (2013.01)

(58) Field of Classification Search
CPC ............... H04B 1/56; H04B 1/54; H04L 5/14
See application file for complete search history.

(56) References Cited

U.S. PATENT DOCUMENTS

| 9,467,275 B2 * | 10/2016 | Tetzlaff ..................... H04L 5/14 |
| 10,291,380 B2 * | 5/2019 | Fang ......................... H04L 5/14 |
| 2003/0157908 A1 | 8/2003 | Dalal |
| 2005/0075141 A1 | 4/2005 | Hoffmann et al. |

(Continued)

OTHER PUBLICATIONS

Cordeiro, Carlos et al., "PHY/MAC Complete Proposal Specification", IEEE P802. Wireless LANS, IEEE 802.11-10/0433r2, pp. 1-336, May 17, 2010.

*Primary Examiner* — Jay P Patel
(74) *Attorney, Agent, or Firm* — Dentons US LLP

(57) ABSTRACT

One embodiment of the present invention relates to a method whereby a second node transmits/receives signals in a full duplex radio (FDR) system, the method for transmitting/receiving signals in an FDR system comprising steps in which: the second node transmits a signal to a first node as the second node receives a signal from the first node; the second node transmits Tx/Rx capability information to a third node if the transmission of the signal to the first node is completed during the reception of the signal from the first node; and the second node receives a signal from the third node after transmitting the Tx/Rx capability information.

12 Claims, 11 Drawing Sheets

(56) References Cited

U.S. PATENT DOCUMENTS

| | | | |
|---|---|---|---|
| 2008/0031165 A1* | 2/2008 | Shen | H04B 3/36 370/293 |
| 2008/0112370 A1 | 5/2008 | Kwon | |
| 2015/0016309 A1* | 1/2015 | Fang | H04L 5/14 370/277 |
| 2015/0078215 A1* | 3/2015 | Zhou | H04L 5/003 370/277 |
| 2015/0172038 A1* | 6/2015 | Jiang | H04L 5/143 370/280 |
| 2015/0195079 A1* | 7/2015 | Gong | H04L 5/1415 370/277 |
| 2015/0256319 A1* | 9/2015 | Lahetkangas | H04B 7/2656 370/280 |
| 2016/0021669 A1* | 1/2016 | Tetzlaff | H04L 5/14 370/278 |
| 2016/0067443 A1 | 3/2016 | Hunt et al. | |
| 2016/0088657 A1* | 3/2016 | Djukic | H04L 1/00 |
| 2016/0127108 A1* | 5/2016 | Jindal | H04L 5/14 370/281 |
| 2016/0330788 A1* | 11/2016 | Zheng | H04W 28/0205 |
| 2017/0195107 A1* | 7/2017 | Liu | H04B 7/0452 |
| 2018/0048455 A1* | 2/2018 | Lim | H04L 5/0055 |
| 2019/0268130 A1* | 8/2019 | Fang | H04L 5/14 |

* cited by examiner

FIG. 5
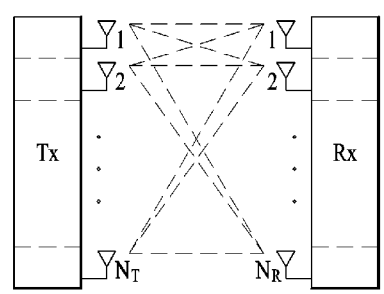
(a)
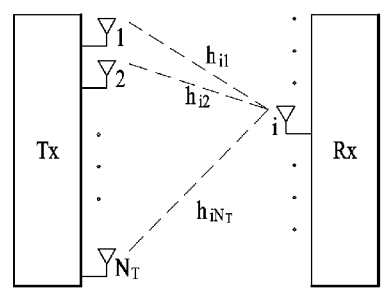
(b)

FIG. 8
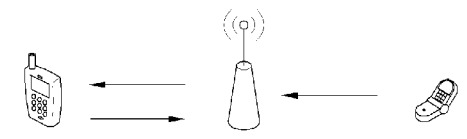
(a)
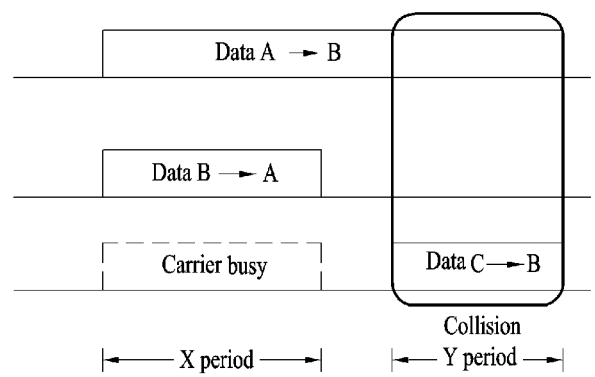
(b)
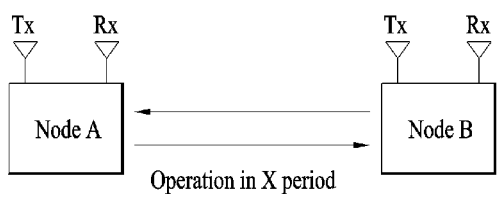
(c)
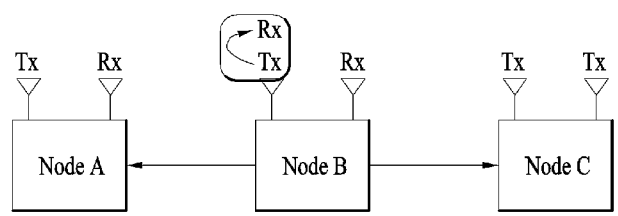
(d)
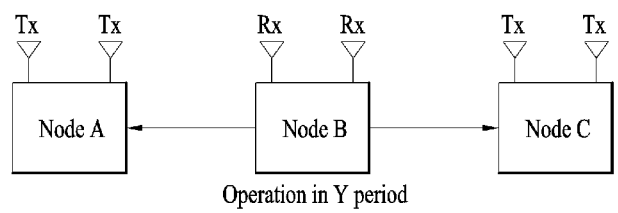

FIG. 9
(a)
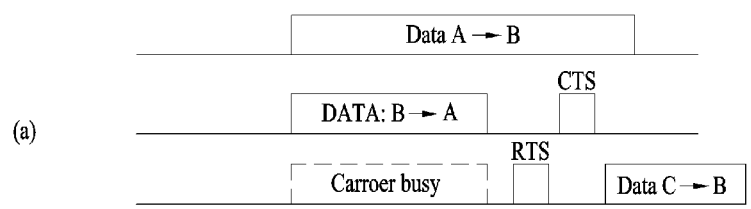
(b)
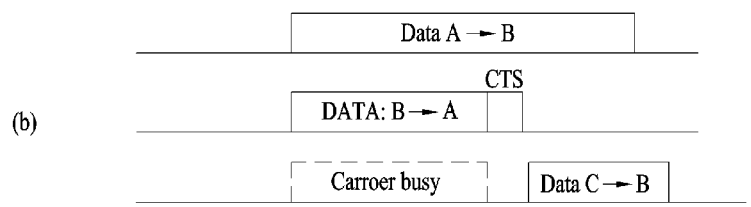

FIG. 10
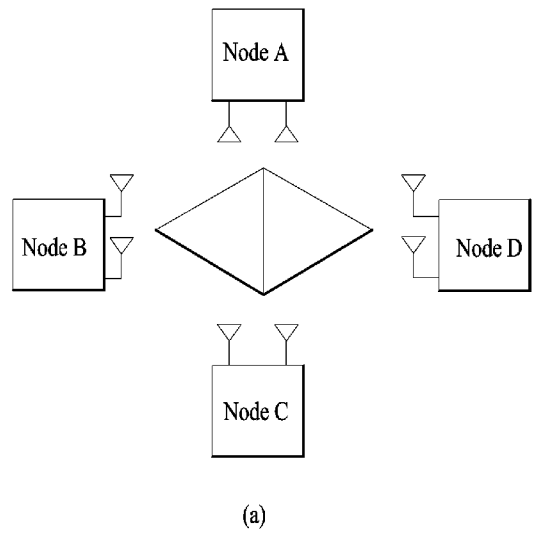
(a)
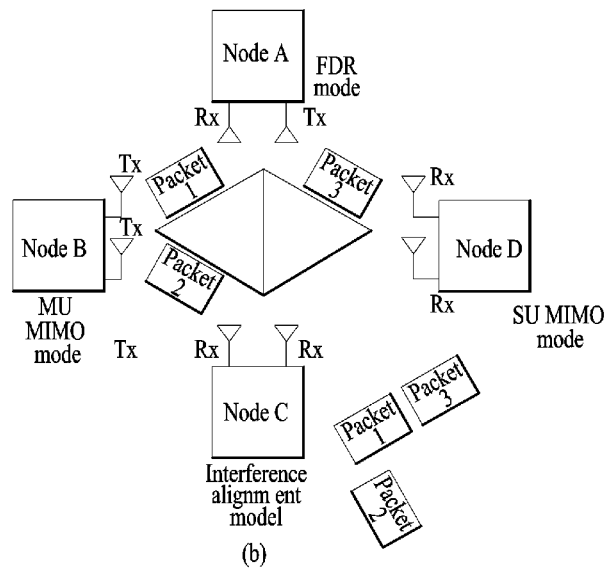
(b)

METHOD AND DEVICE FOR TRANSMITTING/RECEIVING SIGNALS RELATED TO CHANGE OF TX/RX CAPABILITY IN FDR SYSTEM

This application is a 35 use § 371 national stage entry of international application no. PCT/KR2016/012936 filed on Nov. 10, 2016, and claims priority to U.S. provisional application No. 62/253,140 filed on Nov. 10, 2015 and 62/253,141 filed on Nov. 10, 2105, all of which are hereby incorporated by reference in their entireties as if fully set forth herein.

TECHNICAL FIELD

Following description relates to a method of transmitting and receiving a signal related to a change of dynamic Tx/Rx capability in a FDR (full duplex radio) system and an apparatus therefor.

BACKGROUND ART

Wireless communication systems have been widely deployed to provide various types of communication services such as voice or data. In general, a wireless communication system is a multiple access system that supports communication of multiple users by sharing available system resources (a bandwidth, transmission power, etc.) among them. For example, multiple access systems include a Code Division Multiple Access (CDMA) system, a Frequency Division Multiple Access (FDMA) system, a Time Division Multiple Access (TDMA) system, an Orthogonal Frequency Division Multiple Access (OFDMA) system, a Single Carrier Frequency Division Multiple Access (SC-FDMA) system, and a Multi-Carrier Frequency Division Multiple Access (MC-FDMA) system.

DISCLOSURE OF THE INVENTION

Technical Task

A technical task of the present invention is to provide methods of transmitting and receiving a signal in a FDR system related to a change of dynamic Tx/Rx capability.

Technical tasks obtainable from the present invention are non-limited by the above-mentioned technical task. And, other unmentioned technical tasks can be clearly understood from the following description by those having ordinary skill in the technical field to which the present invention pertains.

Technical Solution

To achieve these and other advantages and in accordance with the purpose of the present invention, as embodied and broadly described, according to one embodiment, a method of transmitting and receiving a signal, which is transmitted and received by a second node in a FDR (full duplex radio) system, includes the steps of transmitting, by the second node, a signal to a first node while receiving a signal from the first node, if transmission of a signal transmitted to the first node is completed in the middle of receiving a signal from the first node, transmitting, by the second node, Tx/Rx capability information to a third node, and receiving, by the second node, a signal from the third node after the Tx/Rx capability information is transmitted.

To further achieve these and other advantages and in accordance with the purpose of the present invention, according to a different embodiment, a second node in a FDR (full duplex radio) system includes a transmitter and a receiver, and a processor, the processor configured to transmit a signal to a first node while receiving a signal from a first node, the processor, if transmission of a signal transmitted to the first node is completed in the middle of receiving a signal from the first node, configured to transmit Tx/Rx capability information to a third node, the processor configured to receive a signal from the third node after the Tx/Rx capability information is transmitted.

The Tx/Rx capability information can include Rx capability change information of the second node.

Rx capability change information on the second node may correspond to information indicating that a transmission circuit used for transmitting a signal to the first node is used for receiving a signal.

Signaling for the Tx/Rx capability information can be transmitted in a manner of being included in a CTS (clear to send) frame.

Signaling for the Tx/Rx capability information may correspond to a response for an RTS (request to send) frame received from the third node.

The Tx/Rx capability information can include identification information of the third node.

Advantageous Effects

According to the present invention, it is able to efficiently solve a hidden node problem in a FDR system Effects obtainable from the present invention are non-limited by the above mentioned effect. And, other unmentioned effects can be clearly understood from the following description by those having ordinary skill in the technical field to which the present invention pertains.

DESCRIPTION OF DRAWINGS

The accompanying drawings, which are included to provide a further understanding of the invention and are incorporated in and constitute a part of this specification, illustrate embodiments of the invention and together with the description serve to explain the principles of the invention.

FIG. 5 is a diagram for a configuration of a wireless communication system having multiple antennas;

FIGS. 8 to 10 are diagrams for explaining Tx/Rx capability signaling according to embodiment of the present invention;

BEST MODE

Mode for Invention

Figure 1:
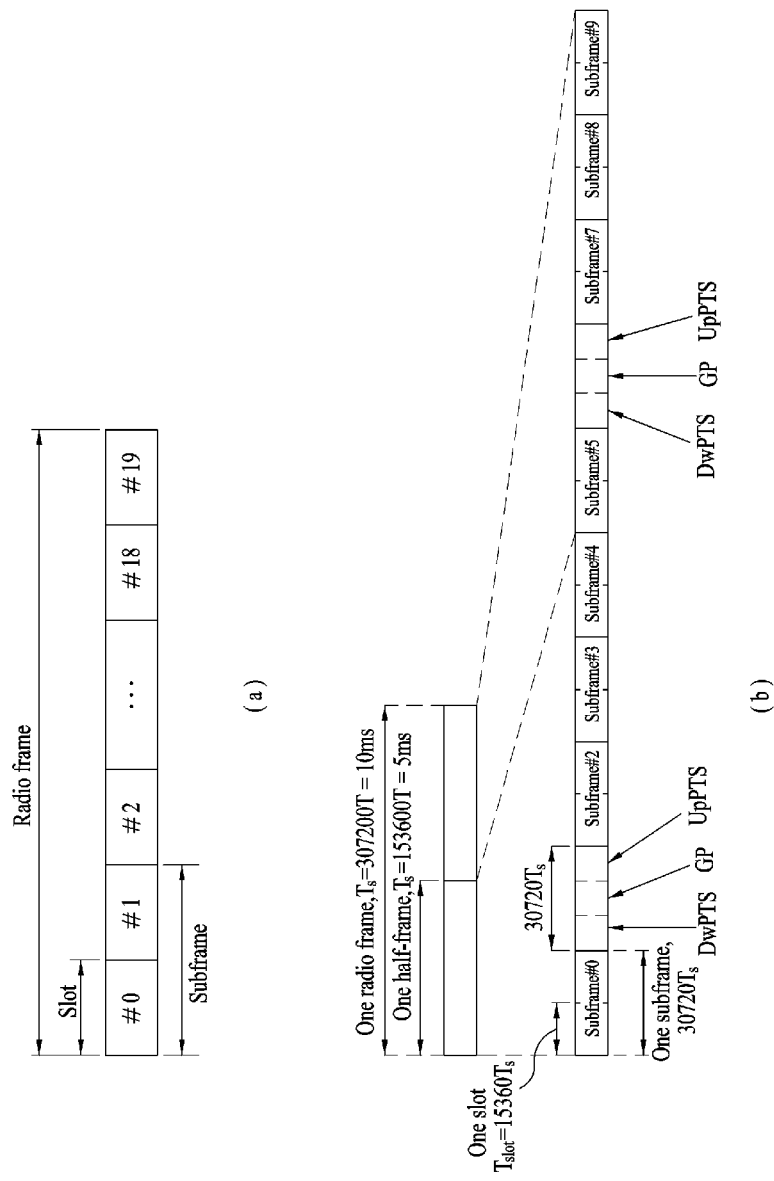
FIG. 1 is a diagram for a structure of a radio frame.

The embodiments of the present invention described hereinbelow are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions or features of any one embodiment may be included in another embodiment and may be replaced with corresponding constructions or features of another embodiment.

In the embodiments of the present invention, a description is made, centering on a data transmission and reception relationship between a Base Station (BS) and a User Equipment (UE). The BS is a terminal node of a network, which communicates directly with a UE. In some cases, a specific operation described as performed by the BS may be performed by an upper node of the BS.

Namely, it is apparent that, in a network comprised of a plurality of network nodes including a BS, various operations performed for communication with a UE may be performed by the BS or network nodes other than the BS. The term 'BS' may be replaced with the term 'fixed station', 'Node B', 'evolved Node B (eNode B or eNB)', 'Access Point (AP)', etc. The term 'relay' may be replaced with the term 'Relay Node (RN)' or' Relay Station (RS)'. The term 'terminal' may be replaced with the term 'UE', 'Mobile Station (MS)', 'Mobile Subscriber Station (MSS)', 'Subscriber Station (SS)', etc.

The term "cell", as used herein, may be applied to transmission and reception points such as a base station (eNB), sector, remote radio head (RRH) and relay, and may also be extensively used by a specific transmission/reception point to distinguish between component carriers.

Specific terms used for the embodiments of the present invention are provided to help the understanding of the present invention. These specific terms may be replaced with other terms within the scope and spirit of the present invention.

In some cases, to prevent the concept of the present invention from being ambiguous, structures and apparatuses of the known art will be omitted, or will be shown in the form of a block diagram based on main functions of each structure and apparatus. Also, wherever possible, the same reference numbers will be used throughout the drawings and the specification to refer to the same or like parts.

The embodiments of the present invention can be supported by standard documents disclosed for at least one of wireless access systems, Institute of Electrical and Electronics Engineers (IEEE) 802, 3rd Generation Partnership Project (3GPP), 3GPP Long Term Evolution (3GPP LTE), LTE-Advanced (LTE-A), and 3GPP2. Steps or parts that are not described to clarify the technical features of the present invention can be supported by those documents. Further, all terms as set forth herein can be explained by the standard documents.

Techniques described herein can be used in various wireless access systems such as Code Division Multiple Access (CDMA), Frequency Division Multiple Access (FDMA), Time Division Multiple Access (TDMA), Orthogonal Frequency Division Multiple Access (OFDMA), Single Carrier-Frequency Division Multiple Access (SC-FDMA), etc. CDMA may be implemented as a radio technology such as Universal Terrestrial Radio Access (UTRA) or CDMA2000. TDMA may be implemented as a radio technology such as Global System for Mobile communications (GSM)/General Packet Radio Service (GPRS)/Enhanced Data Rates for GSM Evolution (EDGE). OFDMA may be implemented as a radio technology such as IEEE 802.11 (Wi-Fi), IEEE 802.16 (WiMAX), IEEE 802.20, Evolved-UTRA (E-UTRA) etc. UTRA is a part of Universal Mobile Telecommunications System (UMTS). 3GPP LTE is a part of Evolved UMTS (E-UMTS) using E-UTRA. 3GPP LTE employs OFDMA for downlink and SC-FDMA for uplink. LTE-A is an evolution of 3GPP LTE. WiMAX can be described by the IEEE 802.16e standard (Wireless Metropolitan Area Network (WirelessMAN)-OFDMA Reference System) and the IEEE 802.16m standard (WirelessMAN-OFDMA Advanced System). For clarity, this application focuses on the 3GPP LTE and LTE-A systems. However, the technical features of the present invention are not limited thereto.

LTE/LTE-A Resource Structure/Channel

With reference to FIG. 1, the structure of a radio frame will be described below.

In a cellular Orthogonal Frequency Division Multiplexing (OFDM) wireless Packet communication system, uplink and/or downlink data Packets are transmitted in subframes. One subframe is defined as a predetermined time period including a plurality of OFDM symbols. The 3GPP LTE standard supports a type-1 radio frame structure applicable to Frequency Division Duplex (FDD) and a type-2 radio frame structure applicable to Time Division Duplex (TDD).

FIG. 1(a) illustrates the type-1 radio frame structure. A downlink radio frame is divided into 10 subframes. Each subframe is further divided into two slots in the time domain. A unit time during which one subframe is transmitted is defined as a Transmission Time Interval (TTI). For example, one subframe may be 1 ms in duration and one slot may be 0.5 ms in duration. A slot includes a plurality of OFDM symbols in the time domain and a plurality of Resource Blocks (RBs) in the frequency domain. Because the 3GPP LTE system adopts OFDMA for downlink, an OFDM symbol represents one symbol period. An OFDM symbol may be referred to as an SC-FDMA symbol or symbol period. An RB is a resource allocation unit including a plurality of contiguous subcarriers in a slot.

The number of OFDM symbols in one slot may vary depending on a Cyclic Prefix (CP) configuration. There are two types of CPs: extended CP and normal CP. In the case of the normal CP, one slot includes 7 OFDM symbols. In the case of the extended CP, the length of one OFDM symbol is increased and thus the number of OFDM symbols in a slot is smaller than in the case of the normal CP. Thus when the extended CP is used, for example, 6 OFDM symbols may be included in one slot. If channel state gets poor, for example, during fast movement of a UE, the extended CP may be used to further decrease Inter-Symbol Interference (ISI).

In the case of the normal CP, one subframe includes 14 OFDM symbols because one slot includes 7 OFDM symbols. The first two or three OFDM symbols of each subframe may be allocated to a Physical Downlink Control CHannel (PDCCH) and the other OFDM symbols may be allocated to a Physical Downlink Shared Channel (PDSCH).

FIG. 1(b) illustrates the type-2 radio frame structure. A type-2 radio frame includes two half frames, each having 5 subframes, a Downlink Pilot Time Slot (DwPTS), a Guard Period (GP), and an Uplink Pilot Time Slot (UpPTS). Each subframe is divided into two slots. The DwPTS is used for initial cell search, synchronization, or channel estimation at a UE. The UpPTS is used for channel estimation and acquisition of uplink transmission synchronization to a UE at an eNB. The GP is a period between an uplink and a downlink, which eliminates uplink interference caused by multipath delay of a downlink signal. One subframe includes two slots irrespective of the type of a radio frame.

The above-described radio frame structures are purely exemplary and thus it is to be noted that the number of subframes in a radio frame, the number of slots in a subframe, or the number of symbols in a slot may vary.

Figure 2:
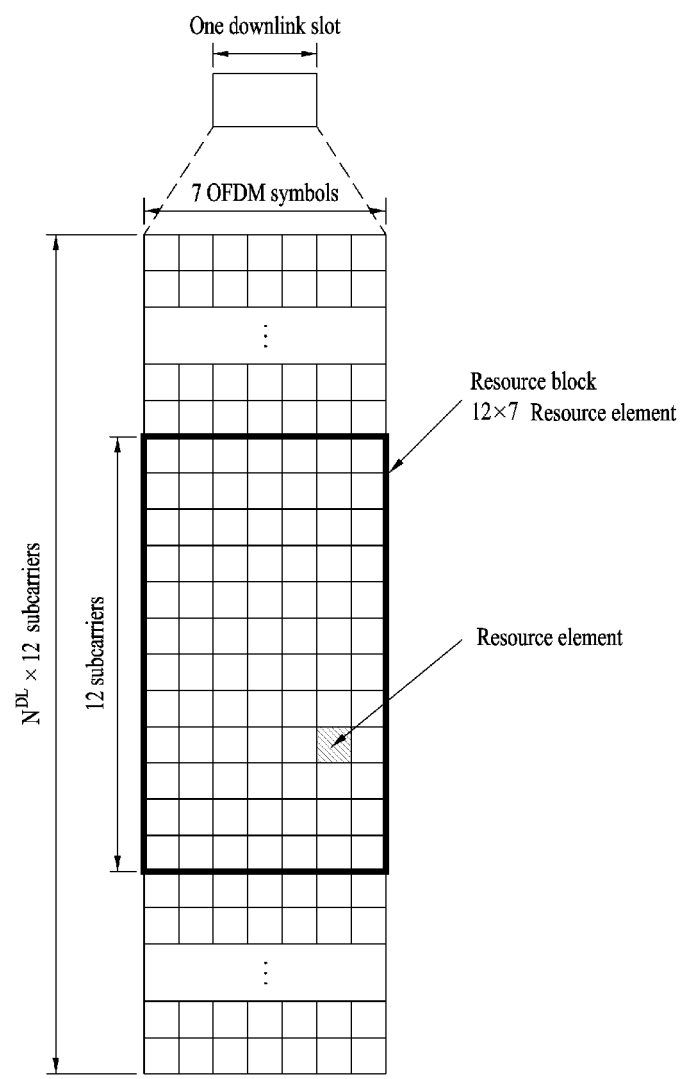
FIG. 2 is a diagram for a resource grid in a downlink slot.

FIG. 2 illustrates the structure of a downlink resource grid for the duration of one downlink slot. A downlink slot includes 7 OFDM symbols in the time domain and an RB includes 12 subcarriers in the frequency domain, which does not limit the scope and spirit of the present invention. For example, a downlink slot may include 7 OFDM symbols in the case of the normal CP, whereas a downlink slot may include 6 OFDM symbols in the case of the extended CP. Each element of the resource grid is referred to as a Resource Element (RE). An RB includes 12×7 REs. The number of RBs in a downlink slot, NDL depends on a downlink transmission bandwidth. An uplink slot may have the same structure as a downlink slot.

Figure 3:
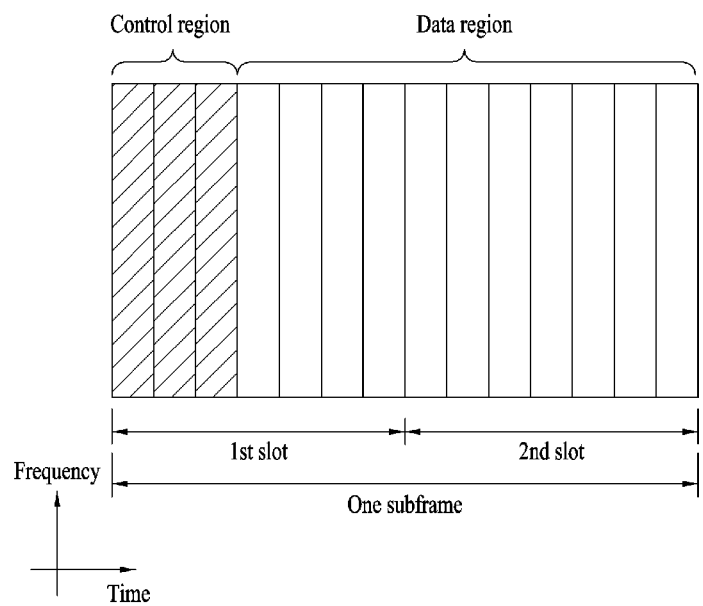
FIG. 3 is a diagram for a structure of a downlink subframe.

FIG. 3 illustrates the structure of a downlink subframe. Up to three OFDM symbols at the start of the first slot in a downlink subframe are used for a control region to which control channels are allocated and the other OFDM symbols of the downlink subframe are used for a data region to which a PDSCH is allocated. Downlink control channels used in the 3GPP LTE system include a Physical Control Format Indicator CHannel (PCFICH), a Physical Downlink Control CHannel (PDCCH), and a Physical Hybrid automatic repeat request (HARQ) Indicator CHannel (PHICH). The PCFICH is located in the first OFDM symbol of a subframe, carrying information about the number of OFDM symbols used for transmission of control channels in the subframe. The PHICH delivers an HARQ ACKnowledgment/Negative ACKnowledgment (ACK/NACK) signal in response to an uplink transmission. Control information carried on the PDCCH is called Downlink Control Information (DCI). The DCI transports uplink or downlink scheduling information, or uplink transmission power control commands for UE groups. The PDCCH delivers information about resource allocation and a transport format for a Downlink Shared CHannel (DL-SCH), resource allocation information about an Uplink Shared CHannel (UL-SCH), paging information of a Paging CHannel (PCH), system information on the DL-SCH, information about resource allocation for a higher-layer control message such as a Random Access Response transmitted on the PDSCH, a set of transmission power control commands for individual UEs of a UE group, transmission power control information, Voice Over Internet Protocol (VoIP) activation information, etc. A plurality of PDCCHs may be transmitted in the control region. A UE may monitor a plurality of PDCCHs. A PDCCH is formed by aggregating one or more consecutive Control Channel Elements (CCEs). A CCE is a logical allocation unit used to provide a PDCCH at a coding rate based on the state of a radio channel. A CCE includes a plurality of RE groups. The format of a PDCCH and the number of available bits for the PDCCH are determined according to the correlation between the number of CCEs and a coding rate provided by the CCEs. An eNB determines the PDCCH format according to DCI transmitted to a UE and adds a Cyclic Redundancy Check (CRC) to control information. The CRC is masked by an Identifier (ID) known as a Radio Network Temporary Identifier (RNTI) according to the owner or usage of the PDCCH. If the PDCCH is directed to a specific UE, its CRC may be masked by a cell-RNTI (C-RNTI) of the UE. If the PDCCH is for a paging message, the CRC of the PDCCH may be masked by a Paging Indicator Identifier (P-RNTI). If the PDCCH carries system information, particularly, a System Information Block (SIB), its CRC may be masked by a system information ID and a System Information RNTI (SI-RNTI). To indicate that the PDCCH carries a Random Access Response in response to a Random Access Preamble transmitted by a UE, its CRC may be masked by a Random Access-RNTI (RA-RNTI).

Figure 4:
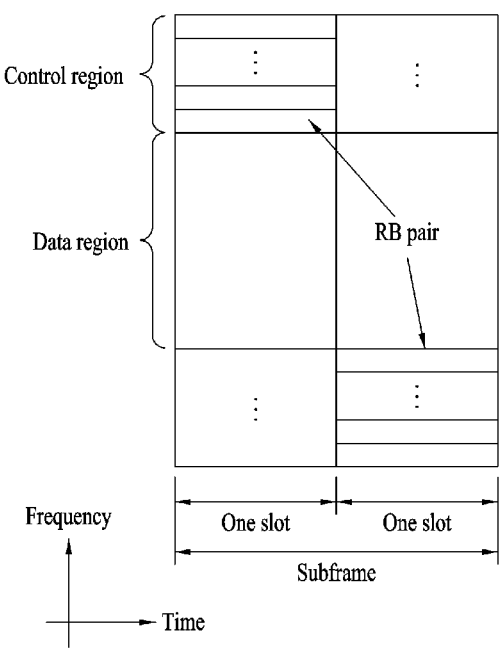
FIG. 4 is a diagram for a structure of an uplink subframe.

FIG. 4 illustrates the structure of an uplink subframe. An uplink subframe may be divided into a control region and a data region in the frequency domain. A Physical Uplink Control CHannel (PUCCH) carrying uplink control information is allocated to the control region and a Physical Uplink Shared Channel (PUSCH) carrying user data is allocated to the data region. To maintain the property of a single carrier, a UE does not transmit a PUSCH and a PUCCH simultaneously. A PUCCH for a UE is allocated to an RB pair in a subframe. The RBs of the RB pair occupy different subcarriers in two slots. Thus it is said that the RB pair allocated to the PUCCH is frequency-hopped over a slot boundary.

Reference Signals (RSs)

In a wireless communication system, a Packet is transmitted on a radio channel. In view of the nature of the radio channel, the Packet may be distorted during the transmission. To receive the signal successfully, a receiver should compensate for the distortion of the received signal using channel information. Generally, to enable the receiver to acquire the channel information, a transmitter transmits a signal known to both the transmitter and the receiver and the receiver acquires knowledge of channel information based on the distortion of the signal received on the radio channel. This signal is called a pilot signal or an RS.

In the case of data transmission and reception through multiple antennas, knowledge of channel states between Transmission (Tx) antennas and Reception (Rx) antennas is required for successful signal reception. Accordingly, an RS should be transmitted through each Tx antenna.

RSs may be divided into downlink RSs and uplink RSs. In the current LTE system, the uplink RSs include:

i) DeModulation-Reference Signal (DM-RS) used for channel estimation for coherent demodulation of information delivered on a PUSCH and a PUCCH; and ii) Sounding Reference Signal (SRS) used for an eNB or a network to measure the quality of an uplink channel in a different frequency.

The downlink RSs are categorized into:

i) Cell-specific Reference Signal (CRS) shared among all UEs of a cell;

ii) UE-specific RS dedicated to a specific UE;

iii) DM-RS used for coherent demodulation of a PDSCH, when the PDSCH is transmitted;

iv) Channel State Information-Reference Signal (CSI-RS) carrying CSI, when downlink DM-RSs are transmitted;

v) Multimedia Broadcast Single Frequency Network (MBSFN) RS used for coherent demodulation of a signal transmitted in MBSFN mode; and vi) positioning RS used to estimate geographical position information about a UE.

RSs may also be divided into two types according to their purposes: RS for channel information acquisition and RS for data demodulation. Since its purpose lies in that a UE acquires downlink channel information, the former should be transmitted in a broad band and received even by a UE that does not receive downlink data in a specific subframe. This RS is also used in a situation like handover. The latter is an RS that an eNB transmits along with downlink data in specific resources. A UE can demodulate the data by measuring a channel using the RS. This RS should be transmitted in a data transmission area.

Modeling of MIMO System

FIG. 5 is a diagram illustrating a configuration of a wireless communication system having multiple antennas.

As shown in FIG. 5(a), if the number of transmit antennas is increased to NT and the number of receive antennas is increased to NR, a theoretical channel transmission capacity is increased in proportion to the number of antennas, unlike the case where a plurality of antennas is used in only a transmitter or a receiver. Accordingly, it is possible to improve a transfer rate and to remarkably improve frequency efficiency. As the channel transmission capacity is increased, the transfer rate may be theoretically increased by a product of a maximum transfer rate Ro upon utilization of a single antenna and a rate increase ratio Ri.

$$R_i = \min(N_T, N_R) \qquad \text{[Equation 1]}$$

For instance, in an MIMO communication system, which uses 4 transmit antennas and 4 receive antennas, a transmission rate 4 times higher than that of a single antenna system can be obtained. Since this theoretical capacity increase of the MIMO system has been proved in the middle of 90's, many ongoing efforts are made to various techniques to substantially improve a data transmission rate. In addition, these techniques are already adopted in part as standards for various wireless communications such as 3G mobile communication, next generation wireless LAN and the like.

The trends for the MIMO relevant studies are explained as follows. First of all, many ongoing efforts are made in various aspects to develop and research information theory study relevant to MIMO communication capacity calculations and the like in various channel configurations and multiple access environments, radio channel measurement and model derivation study for MIMO systems, spatiotemporal signal processing technique study for transmission reliability enhancement and transmission rate improvement and the like.

In order to explain a communicating method in an MIMO system in detail, mathematical modeling can be represented as follows. It is assumed that there are NT transmit antennas and NR receive antennas.

Regarding a transmitted signal, if there are NT transmit antennas, the maximum number of pieces of information that can be transmitted is NT. Hence, the transmission information can be represented as shown in Equation 2.

$$s = [s_1, s_2, \ldots, s_{N_T}]^T \qquad \text{[Equation 2]}$$

Meanwhile, transmit powers can be set different from each other for individual pieces of transmission information $s_1, s_2, \ldots, s_{N_T}$, respectively. If the transmit powers are set to $P_1, P_2, \Lambda, P_{N_T}$, respectively, the transmission information with adjusted transmit powers can be represented as Equation 3.

$$\hat{s} = [\hat{s}_1, \hat{s}_2, \ldots, \hat{s}_{N_T}]^T = [P_1 s_1, P_2 s_2, \ldots, P_{N_T} s_{N_T}]^T \qquad \text{[Equation 3]}$$

In addition, $\hat{S}$ can be represented as Equation 4 using diagonal matrix P of the transmission power.

$$\hat{s} = \begin{bmatrix} P_1 & & & 0 \\ & P_2 & & \\ & & \ddots & \\ 0 & & & P_{N_T} \end{bmatrix} \begin{bmatrix} s_1 \\ s_2 \\ \vdots \\ s_{N_T} \end{bmatrix} = Ps \qquad \text{[Equation 4]}$$

Assuming a case of configuring NT transmitted signals $x_1, x_2, \ldots, x_{N_T}$, which are actually transmitted, by applying weight matrix W to the information vector $\hat{S}$ having the adjusted transmit powers, the weight matrix W serves to appropriately distribute the transmission information to each antenna according to a transport channel state. $x_1, x_2, \ldots, x_{N_T}$, can be expressed by using the vector X as follows.

$$x = \begin{bmatrix} x_1 \\ x_2 \\ \vdots \\ x_i \\ \vdots \\ x_{N_T} \end{bmatrix} = \begin{bmatrix} w_{11} & w_{12} & \ldots & w_{1N_T} \\ w_{21} & w_{22} & \ldots & w_{2N_T} \\ \vdots & & \ddots & \\ w_{i1} & w_{i2} & \ldots & w_{iN_T} \\ \vdots & & & \ddots \\ w_{N_T 1} & w_{N_T 2} & \ldots & w_{N_T N_T} \end{bmatrix} \begin{bmatrix} \hat{s}_1 \\ \hat{s}_2 \\ \vdots \\ \hat{s}_j \\ \vdots \\ \hat{s}_{N_T} \end{bmatrix} = \qquad \text{[Equation 5]}$$

$$W\hat{s} = WPs$$

In Equation 5, $w_{ij}$ denotes a weight between an ith transmit antenna and jth information. W is also called a precoding matrix.

If the NR receive antennas are present, respective received signals $y_1, y_2, \ldots, y_{N_R}$, of the antennas can be expressed as follows.

$$y = [y_1, y_2, \ldots, y_{N_R}]^T \qquad \text{[Equation 6]}$$

If channels are modeled in the MIMO wireless communication system, the channels may be distinguished according to transmit/receive antenna indexes. A channel from the transmit antenna j to the receive antenna i is denoted by $h_{ij}$. In $h_{ij}$, it is noted that the indexes of the receive antennas precede the indexes of the transmit antennas in view of the order of indexes.

FIG. 5(b) is a diagram illustrating channels from the NT transmit antennas to the receive antenna i. The channels may be combined and expressed in the form of a vector and a matrix. In FIG. 5(b), the channels from the NT transmit antennas to the receive antenna i can be expressed as follows.

$$h_i^T = [h_{i1}, h_{i2}, \ldots, h_{iN_T}] \qquad \text{[Equation 7]}$$

Accordingly, all channels from the NT transmit antennas to the NR receive antennas can be expressed as follows.

$$H = \begin{bmatrix} h_1^T \\ h_2^T \\ \vdots \\ h_i^T \\ \vdots \\ h_{N_R}^T \end{bmatrix} = \begin{bmatrix} h_{11} & h_{12} & \ldots & h_{1N_T} \\ h_{21} & h_{22} & \ldots & h_{2N_T} \\ \vdots & & \ddots & \\ h_{i1} & h_{i2} & \ldots & h_{iN_T} \\ \vdots & & & \ddots \\ h_{N_R 1} & h_{N_R 2} & \ldots & h_{N_R N_T} \end{bmatrix} \qquad \text{[Equation 8]}$$

An AWGN (Additive White Gaussian Noise) is added to the actual channels after a channel matrix H. The AWGN $n_1, n_2, \ldots, n_{N_R}$ respectively added to the NR receive antennas can be expressed as follows.

$$n = [n_1, n_2, \ldots, n_{N_R}]^T \qquad \text{[Equation 9]}$$

Through the above-described mathematical modeling, the received signals can be expressed as follows.

$$y = \begin{bmatrix} y_1 \\ y_2 \\ \vdots \\ y_i \\ \vdots \\ y_{N_R} \end{bmatrix} = \begin{bmatrix} h_{11} & h_{12} & \cdots & h_{1N_T} \\ h_{21} & h_{22} & \cdots & h_{2N_T} \\ \vdots & & \ddots & \vdots \\ h_{i1} & h_{i2} & \cdots & h_{iN_T} \\ \vdots & & \ddots & \vdots \\ h_{N_R 1} & h_{N_R 2} & \cdots & h_{N_R N_T} \end{bmatrix} \begin{bmatrix} x_1 \\ x_2 \\ \vdots \\ x_j \\ \vdots \\ x_{N_T} \end{bmatrix} + \begin{bmatrix} n_1 \\ n_2 \\ \vdots \\ n_i \\ \vdots \\ n_{N_R} \end{bmatrix} =$$

[Equation 10]

$$Hx + n$$

Meanwhile, the number of rows and columns of the channel matrix H indicating the channel state is determined by the number of transmit and receive antennas. The number of rows of the channel matrix H is equal to the number NR of receive antennas and the number of columns thereof is equal to the number NR of transmit antennas. That is, the channel matrix H is an NR×NT matrix.

The rank of the matrix is defined by the smaller of the number of rows and the number of columns, which are independent from each other. Accordingly, the rank of the matrix is not greater than the number of rows or columns. The rank rank (H) of the channel matrix H is restricted as follows.

$$\text{rank}(H) \leq \min(N_T, N_R) \quad \text{[Equation 11]}$$

Additionally, the rank of a matrix can also be defined as the number of non-zero Eigen values when the matrix is Eigen-value-decomposed. Similarly, the rank of a matrix can be defined as the number of non-zero singular values when the matrix is singular-value-decomposed. Accordingly, the physical meaning of the rank of a channel matrix can be the maximum number of channels through which different pieces of information can be transmitted.

In the description of the present document, 'rank' for MIMO transmission indicates the number of paths capable of sending signals independently on specific time and frequency resources and 'number of layers' indicates the number of signal streams transmitted through the respective paths. Generally, since a transmitting end transmits the number of layers corresponding to the rank number, one rank has the same meaning of the layer number unless mentioned specially.

FDR (Full Duplex Radio) System

A FDR (full duplex radio system) corresponds to a system that a transmission operation and a reception operation are performed at the same time in a single node (a UE or a base station). To this end, it is necessary for a UE to have capability capable of cancelling self-interference. The full duplex system can be mainly classified into two types. One type is a system that only a stationary terminal such as a base station or an AP has a full duplex function and terminals connected with the stationary terminal have a half-duplex function only. Another type is a full duplex FDR system that all terminals, a base station, an AP, etc. belonging to a network have full duplex capability. In the following, the stationary terminal and the terminal are referred to as an eNB and a UE, respectively. And, it may consider two scenarios i) FDR eNB+non-FDR or HDR (half duplex radio) UE and ii) FDR eNB+FDR UE.

Figure 6:
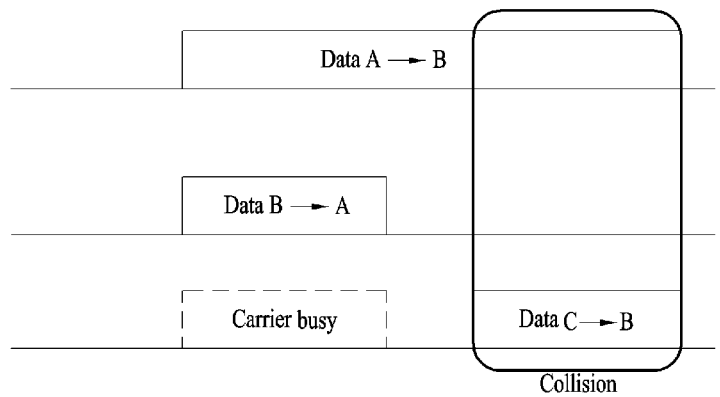
FIG. 6 is a diagram for explaining a hidden node problem of a FDR.

Meanwhile, a hidden node problem may occur in a FDR as well and an example of the hidden node problem is shown in FIG. 6. In FIG. 6, assume that a first node (node A) and a third node (node C) are unable to detect a mutual signal (via carrier sensing) because the nodes are away from each other. Referring to FIG. 6, the first node transceive a signal with the second node in an FDR mode. However, since a data amount to be transmitted by the second node is different from a data amount to be transmitted by first node, transmission is stopped/terminated while the second node receives data from the first node. In this case, the third node assumes/senses that a channel is idle and may perform data transmission. In this case, since the second node receives a signal from the third node while continuously receiving data from the first node, a collision occurs and the second node fails to receive a packet. In particular, a hidden node problem may also occur in the FDR system due to asymmetry of a packet size between nodes.

Figure 7:
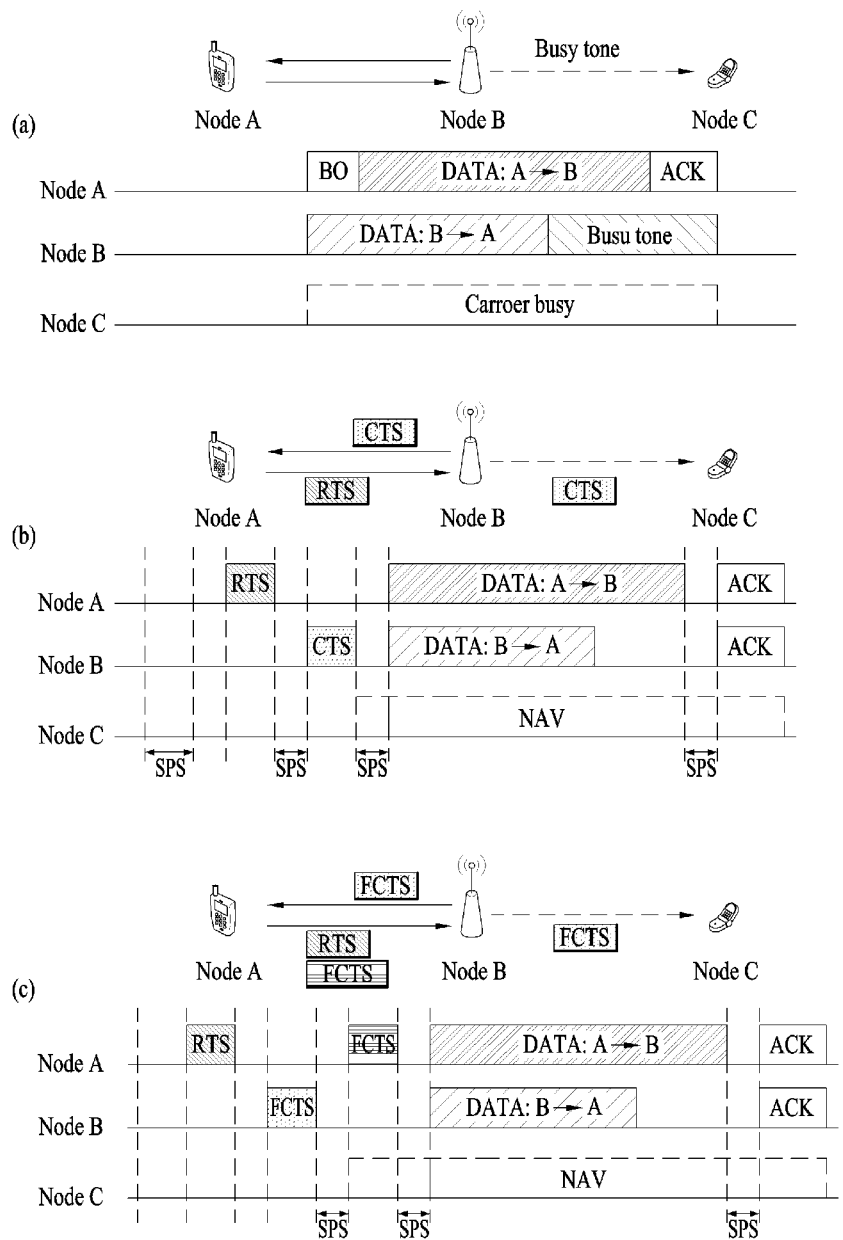
FIG. 7 illustrates legacy methods for solving a hidden node problem of a FDR.

Various legacy methods for solving the hidden node problem are disclosed in FIG. 7. Referring to FIG. 7 (*a*), a busy tone is transmitted to make a third node not to perform transmission to solve the hidden node problem. FIG. 7 (*b*) illustrates a modified RTS (request to send)/CTS (clear to send) method. Referring to FIG. 7 (*b*), the first node transmits RTS before the first node transmits data and the second node transmits CTS. In this case, when a NAV (network allocation vector) is configured, the NAV is configured not by a size of data to be transmitted by the second node but by a size of data to be received by the second node. And, the second node transmits the NAV via the CTS. By doing so, the third node does not transmit data while the NAV is configured, thereby solving the hidden node problem. Referring to FIG. 7 (*c*), the first node transmits RTS and notifies that the first node is ready for receiving data and has data to transmit while transmitting FCTS (full duplex CTS). In this case, the first node transmits a FCTS signal indicating that the first node is ready for receiving data. In this case, FCTS sends NAV. Similar to the legacy study 2, the NAV is configured not by a size of data to be transmitted by the first node only but by sizes of data to be transmitted and received by the first node. UEs near the first node receive the NAV and do not perform a transmission operation during the NAV (The legacy methods shown in FIG. 7 commonly aim to make neighboring nodes not to perform transmission to solve the hidden node problem in FDR. Since the methods require signaling overhead such as RTS/CTS and reduce time for performing a FDR operation, it may have a demerit in that it is unable to obtain a gain via the FDR.

In the following, a method capable of solving a hidden node problem as well as a problem capable of being occurred due to the legacy methods for enhancing a legacy hidden node problem is explained. Methods of configuring an antenna related to the following description are explained. i) Method of performing a transmission operation and a reception operation at the same time in a single antenna using such an element as a circulator. ii) Method of reducing interference between antennas by respectively implementing a transmission antenna and a reception antenna and physically separating the transmission antenna from the reception antenna. If a physical antenna is separately installed in a UE for transmission and reception, the antenna is not restricted to a transmission operation and a reception operation only. In some cases, the antenna may perform 'transmission+transmission' operation or 'reception+reception' operation. To this end, an RF chain of a UE and a baseband chain should be additionally installed in the antenna. Yet, if an antenna is already installed for a full duplex radio operation due to a structure of a UE, since a size of an RF chip or a baseband chip of the UE is relatively smaller than a size of the antenna, it is able to implement the RF chip or the baseband chip of the UE. For example, if an antenna for performing an FDR operation is additionally installed in the UE and the UE has additional baseband and RF chains as many as the number of antennas, it may be able to dynamically change a transmission operation and a reception operation. This dynamic mode switching can make an additional performance gain to be obtained.

Dynamic Change of Tx, Rx, FDR Mode

A second node can transmit a signal to a first node while receiving a signal from the first node. While the second node receives a signal from the first node, if transmission of a signal transmitted to the first node is completed, the second node can transmit Tx/Rx capability information to a third node. In this case, the Tx/Rx capability corresponds to capability of a UE capable of performing transmission and reception on a specific band. In this case, the capability includes all or a part of the (maximum and/or minimum) number of antennas, the (maximum and/or minimum) number of layers capable of performing transmission or reception, the (maximum and/or minimum) number of ranks capable of performing transmission or reception, the (maximum and/or minimum) number of codewords capable of performing transmission or reception, and the (maximum and/or minimum) number of antenna ports capable of performing transmission or reception (In this case, an antenna port may correspond to a virtual antenna seen from a baseband of a UE rather than a physical antenna). The Tx/Rx capability may vary depending on a band. The Tx/Rx capability may vary according to time and can be seen as different Tx/Rx capability to a different node.

In this case, the Tx/Rx capability information can include Rx capability change information of the second node and the Rx capability change information of the second node may correspond to information indicating that a Tx circuit used for transmitting a signal to the first node is used for receiving a signal. In particular, the second node assumes that the second node is able to switch a Tx circuit of the second node into Rx mode and indicates the Tx circuit switched to the Rx mode to the third node. If the second node finishes data transmission, the second node informs the third node hat Tx capability of the second node is all used and the second node is able to switch the Tx capability into Rx mode.

It may be able to use one of methods described in the following as a Tx/Rx capability signaling method. i) method of transmitting Tx/Rx capability signaling to nearby UEs together with RTS/CTS packet and ii) method of signaling Tx/Rx capability signaling to a different UE in a separate control channel form. According to the method i), a UE can transmit current Tx/Rx capability information of the UE, Tx/Rx capability change information of near future, or equivalent information to nearby UEs while notifying that the UE has data (e.g., RTS, CTS packet) to transmit or data to receive. Having received the information, the nearby UEs recognize a specific UE currently performing transmission/reception with certain Tx/Rx capability and can transmit information indicating whether or not the nearby UEs have data to transmit or data to receive in a signal form such as RTS/CTS. The nearby UEs can also signal Tx/Rx capability of the UEs together with RTS/CTS packet. The method ii) can be utilized not for a dispersive scheduling scheme such as WiFi but for a cellular scheme. According to the method ii), a control channel is additionally configured, Tx/Rx capability of current timing or Tx/Rx capability of near future is included in the control channel, and the control channel is signaled to a nearby UE/eNB, a specific UE, or an eNB via physical layer signaling or higher layer signaling. Of course, the method ii) is not restricted to a cellular system only. A control channel may signal capability of a UE irrespective of RTS/CTS/FCTS/FRST.

Subsequently, the second node can receive a signal from the third node after the Tx/Rx capability information is transmitted.

FIG. 8 illustrates a detail example of the aforementioned contents. Referring to FIG. 8, when a first node transceive a signal with a second node during X period, the second node uses two antennas (or two FDR circuits) in Tx mode and Rx mode, respectively (FIG. 8 (*b*)). If transmission of a signal transmitted to the first node is completed, the second node switches the antenna/circuit of Tx mode into Rx mode in Y period (FIG. 8 (*c*)) and receives a signal from a third node (FIG. 8 (*d*)). By doing so, the hidden node problem mentioned earlier in FIG. 6 can be solved. FIG. 9 illustrates examples of the aforementioned Tx/RX capability signaling methods i) and ii).

Meanwhile, it may also be able to implement a form different from the aforementioned Tx/Rx capability signaling. Specifically, if the second node knows Tx/Rx capability and/or channel states of the nearby UEs in advance, the second node can signal the Tx/Rx capability and/or the channel states of the nearby UEs to each UE or an eNB in a form of PMI and/or RI request (or feedback) instead of such explicit capability as Tx/Rx capability. For example, referring back to FIG. 6, assume that each node has 4 antennas (or Tx/Rx circuits). The second node can transceive a signal with the first node in FDR mode using two Tx antennas and two Rx antennas. If the second node transmits all data to the first node and does not have data to transmit, the second node can inform the third node (if the second node knows that the third node transmits nothing in advance) of the change of the Tx/Rx capability of the second node in a manner of signaling a PMI request (or feedback) and/or RI to make the third node transmit PMI of which a rank corresponds to 2 and 4 Tx. Having received the PMI request and/or the RI, the third node may start to transmit a signal using the PMI and/or the RI requested by the second node.

As mentioned in the foregoing description, Tx/Rx capability of a specific node can be dynamically changed. The change of the Tx/Rx capability can be seen as different capability to a specific UE. Hence, it may signal node specific and time varying Tx/Rx capability. To this end, it may be able to signal identification information (e.g., an ID capable of specifying a node or information of a form equivalent to the ID) together with the Tx/Rx capability to indicate a node to which the Tx/Rx capability is heading. Or, resources are separated to make identification information of a node to be known. It may be able to configure a resource for indicating Tx/Rx capability of a specific node in advance (or via a network) in a specific resource region.

The scope of the present invention is not restricted to a UE only. A function of the flexible radio can also be installed in a stationary base station such as an eNB or an AP. The Tx/Rx capability change of the node can be signaled between an eNB and a UE, between UEs, or between eNBs. For example, when a specific eNB performs transmission only in DL mode, the specific eNB may intend to receive a signal from a nearby eNB. In this case, if the specific eNB informs the nearby eNB or a nearby UE that the specific eNB is able to switch a partial antenna in Rx mode via physical layer signaling or higher layer signaling, the nearby eNB or the nearby UE knows that the nearby eNB or the nearby UE is able to perform transmission and can start to transmit data.

FIG. 10 is a diagram for explaining a performance gain capable of being obtained by Tx/Rx change among a plurality of nodes. In FIG. 10, assume that a node B and a node D is disconnected due to weak channel strength. In the UE topology shown in FIG. 10 (a), maximum degrees of freedom (DoF) becomes 2.

Referring to FIG. 10, a node B transmits two streams to a node A and a node C, respectively, and the node A transmits a signal to a node D. In this case, a stream transmitted by the node A can be aligned with a stream transmitted by the node C. In this case, since interference is aligned in single domain, the node C can receive a signal from the node B without interference. And, the node A and the node C can also receive a stream without interference. In particular, it is able to achieve DoF 3. In particular, if it is able to dynamically change Tx/Rx capability of a UE, overall throughput can be enhanced in the aspect of a network. This operation can be implemented via node specific and time varying Tx/Rx capability signaling.

Interference Measurement in FDR System

In a FDR system, it is necessary to appropriately control interference between UEs. Otherwise, a performance gain of the FDR can be lost. In particular, it may have more serious interference between a UL UE and a DL UE compared to legacy eIMTA. This is because, while the interference of the legacy eIMTA occurs due to a different UL DL mode between cells different from each other, since UEs use a different duplex mode in a cell in the FDR, a UL UE may cause significant interference to a DL UE. In order to solve the problem, it is necessary for an eNB to schedule the UL UE and the DL UE not to cause any interference between the UL UE and the DL UE. To this end, interference measurement and feedback should be performed between UEs to maximize the performance gain of the FDR.

In the FDR system described in the following, an interference measurement method assumes the i) FDR eNB+ non-FDR or HDR (half duplex radio) UE. In the system configuration, since a UE corresponds to a HDR UE, the UE is unable to transmit and receive a signal at the same time. In this case, it is necessary to distinguish a UE transmitting a reference signal (RS) from a UE receiving the RS using time domain to measure interference between the UEs. In order for the N number of UEs measure a channel, NC2 number of signaling are required (to indicate a UE transmitting a signal and a UE receiving a signal) and it causes considerable overhead. And, since the N numbers of UEs transmit signals in time domain in a manner of being distinguished from each other, it may cause considerable latency for FDR scheduling. When a reference signal is transmitted and received between UEs for FDR, if the reference signal is FDMed or CDMed, it is probable that it may fail to receive a signal of a specific UE due to a near far effect. This is because a UL UE applies UL OLPC (open loop power control) in a legacy cellular network to receive power similar to reception power of an eNB. However, since it is unable to perform power control between UEs, if a neighboring UE transmits a signal to a specific UE with strong power, the specific UE may receive the signal with very different reception power. In particular, since a considerable difference of reception power may occur on a reception signal according to a UE, it may lose a signal of weak reception power in ADC.

Methods for the N number of UEs to measure mutual interference are explained in the following.

As a first method, it may consider a method that the N numbers of UEs alternately transmit a reference signal and other UEs measure the reference signal. If a signal is transmitted between UEs in a unit of a subframe, a network can configure the N number of subframes to UEs for interference measurement via physical layer signaling or higher layer signaling. In this case, the network can inform each of the UEs of information on a UE transmitting a signal, a subframe in which a signal is transmitted, a resource position at which a signal is transmitted, a UE receiving a signal, and a resource in which a signal is received via physical layer signaling or higher layer signaling. In this case, the network can inform UEs or a UE group of an RS and a port for transmitting the RS via physical layer signaling or higher layer signaling. A transmission UE transmits a signal using the RS and the RS port indicated by the network at the resource position indicated by the network. A UE, which is indicated to receive the signal, measures the signal and reports the measured signal to the network. Or, the UE may refer to the signal in determining a location, a size, MCS, transmit power, and the like of a resource in which a signal is to be transmitted by the UE.

As a second method, a network configures a resource region for measuring interference between UEs and a UE determines transmission timing in a manner of interlocking the transmission timing with an ID of a UE or RNTI in the resource region. In order to dispersively solve a half-duplex constraint between UEs, it is necessary for a UE to transmit a signal at least two times. In this case, a slot position selected by each UE should be different in the resource region for measuring interference. In order to reduce LLR (low latency radio), it may be able to use a shortened OFDM symbol. In this case, one mini slot can be formed by gathering short OFDM symbols or symbol groups. In this case, the mini slot can include a guard symbol for Tx/Rx switching, a guard symbol for AGC training, or a preamble. For example, AGC is performed by transmitting a preamble of 8 us in WiFi and a preamble of 5 us is required for Tx/Rx switching.

The resource region for measuring interference between UEs can be configured by a single subframe or a plurality of subframes. In this case, a time resource can be divided into a plurality of mini slots. For example, a mini slot can be configured by a plurality of short OFDM symbols.

In the resource region for measuring interference, a transmission count can be determined in advance or can be configured by a network. In this case, a different transmission count can be configured according to a UE. For example, since a UL UE does not perform a signal receiving operation, the UL UE performs transmission with more transmission occasions. Since a DL UE performs a signal receiving operation only, the DL UE may not directly transmit a signal or perform transmission with a transmission occasion of a very small value.

When a mini slot in which transmission is performed is represented as 1 and a mini slot in which transmission is not performed is represented as 0 in time domain, a UE can distinguish the mini slots from each other using on/off code. The on/off code can be determined by an ID preassigned to each UE, RNTI, a cell ID, or the like. It may be able to simply transmit a signal of single tone in a mini slot transmitted by a UE. In this case, in order to measure a signal of a wideband and apply frequency-selective scheduling, it is preferable to transmit a wideband signal. A wideband signal transmitted by a UE may correspond to one selected from the group consisting of a ZC (zadoff-chu), an M-sequence, and a binary/quaternary sequence. In this case, a frequency domain sequence transmitted by a UE can be determined by a UE ID, RNTI, a cell ID, or the like. In particular, a signal transmitted by a UE is determined by the on/off code and a sequence ID transmitted in on code. The on/off code and/or the sequence ID can be determined by all or a part of the UE ID, the RNTI, and the cell ID. There may exist coordination for selecting a signal between cells. To this end, information on all or a part of on/off code and a frequency domain sequence ID used between cells can be shared between eNBs via backhaul. A network can inform a UE of a subframe in which measurement performed between UEs is performed via physical layer signaling or higher layer signaling. The UE can perform a reference signal transmission operation and a reference signal reception operation at a resource position configured by the network using the on/off code and the frequency domain sequence ID determined by the ID of the UE, the RNTI, the cell ID, or the like.

The abovementioned operation can be summarized as Table 1 described in the following.

TABLE 1

Rapid Tx/Rx switching (on/off)
    No need to separate Tx/Rx subframe to measure other UE's channels
    On duration: Transmit a signature
    Off duration: receive other UE's signature TABLE 1-continued Using sparse code
    utilize recovery well known detection algorithms in compressed
    sensing (e.g. Basis pursult, message passing, etc.)
    Good to solve half duplex constraint
A signature can be consist of
    On/off code
    Sequence of frequency domain in on duration
        Sequence ID
Signature index can be associated with
    UE RNTI
    Cell ID
eNB configures UE-to-UE interference measurement subframe to Ues
Each UE reports measurement value in each slot or detected slot.

If on/off code selection and/or sequence ID selection are fixed between eNBs, it may continuously fail to measure inter-UE interference between specific UEs belonging to a different cell. In order to prevent this, an on/off code and/or a sequence ID selected by a UE can hop between measurement resource regions. In this case, the measurement resource regions are periodically or semi-periodically configured, a UE determines an on/off code and/or a seed value of a sequence ID using an ID of the UE, RNTI, or a cell ID, and the seed value becomes a seed value of a random sequence generator to generate a predetermined hopping pattern. The UE can change a resource position at which a signal is transmitted and received according to a measurement resource region in accordance with the hopping pattern. Although the UE fails to measure a signal in a specific resource region, the UE can perform measurement again after prescribed time is elapsed.

Table 2 in the following shows a specific implementation example of a mini slot, an on/off code, and a sequence.

TABLE 2

Figure 11:
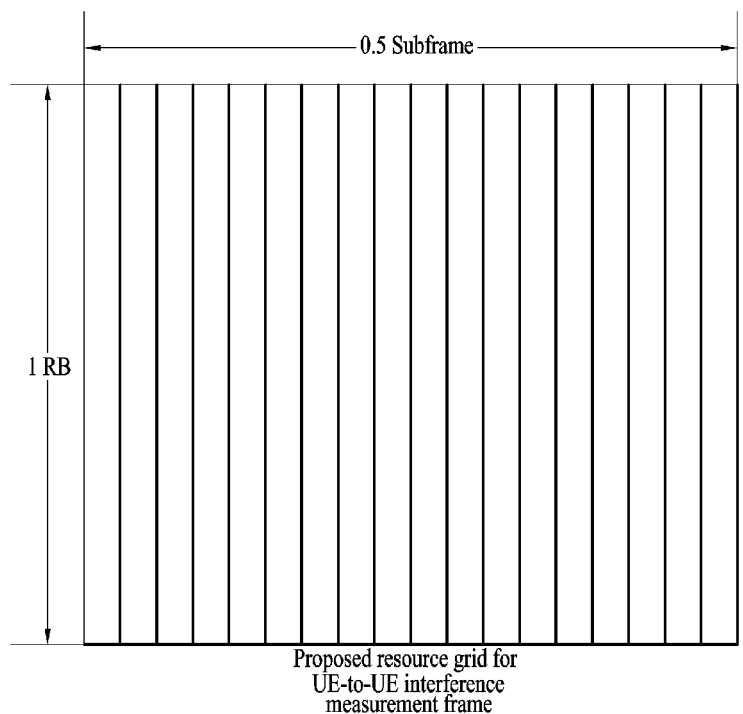
FIG. 11 illustrates a mini slot related to interference measurement according to embodiment of the present invention.

Examplary design
    CP length: 1.39us = 16.7us/12 (can cover 200 m cell radius) - A legacy extended CP is used as CPs by dividing the extended CP into 12 CPs and an OFDM symbol is divided into 12 short OFDM symbols.
    Subcarrier spacing = 180 kHz = 15 kHz * 12: Since one OFDM symbol is reconfigured by 12 short symbols, subcarrier spacing is increased as much as 12 times.
    Symbol length = 6.94us = 5.55us + 1.39us: A length of one OFDM symbol is about 7us.
    One slot = 3 or 4 symbols (one symbol AGC + one (or two) symbol transmission + one symbol Tx/Rx switching period) = 20.82us or 27.76us: A mini slot is configured by concatenating 3 or 4 short OFDM symbols.
    # of on slots within a subframe = 24 or 18 corresponds to the number of mini slots in a subframe.
Sparse code (on/off code)design
    (n, k)
        n: # of on slots
        k: # of on durations
    nCk on/off patterns
        n = 24, k = 2 → 276 patterns
        n = 24, k = 3 → 2024 patterns
        n = 24, k = 4 → 10626 patterns
        n = 18, k = 2 → 153 patterns
        n = 18, k = 3 → 816 patterns
        n = 18, k = 4 → 3060 patterns
Frequency domain sequence
    ZC or M-sequence or single (or multiple) tone
    Cell specific (or UE specific)
Consider MIMO: If a UE is equipped with a plurality of transmission antennas, the UE is able to transmit a plurality of sequences at on duration or select and transmit a plurality of on/off codes. In particular, the UE is able to select a plurality of on/off codes according to a rank of the UE or the number of transmission (or reception) antennas. In particular, the rank of the UE or the number of transmission (or reception) antennas of the UE can also be used as a factor for selecting an on/off code or a frequency domain ID FIG. 11 illustrates an example of a mini slot structure. The proposed resource grid shown in FIG. 11 is configured by shortened symbols (although 18 symbols are illustrated, 24 symbols are possible). It is able to reduce latency for measuring inter-UE interference using the mini slot structure. And, if signaling of a resource for measuring inter-UE interference is determined by a preconfigured UE ID, RNTI, or a cell ID, it is able to reduce signaling overhead. In the mini slot structure, if a UE receives a signal of a different UE, the UE can feedback information on a sequence of an ID and RSRP (signal strength) of the sequence to a network. Or, the UE may be able to directly feedback an ID (a reception signal of a mini slot (a combination of on/off code+frequency domain sequence ID)) of a different UE and RSRP of the different UE to the network via a sparse signal recovery process.

The aforementioned contents are not restricted to the FDR system. It is apparent that it is able to extensively apply the contents to any system for measuring a signal, a channel, and interference amount between UEs. For example, if it is necessary for a system to measure inter-UE interference for D2D communication or, like eIMTA (enhanced interference management and traffic adaptation), when a neighboring cell dynamically switches a mode in DL or UL and inter-UE interference becomes a serious problem, the principle of the present invention can be extensively applied to a system for measuring interference amount between UEs and utilizing the measured interference amount. And, the principle of the present invention can be applied to measure interference between devices not in a cellular system but in such a system applying dispersive scheduling as WiFi.

Examples for the aforementioned proposed methods can also be included as one of implementation methods of the present invention. Hence, it is apparent that the examples are regarded as a sort of proposed schemes. The aforementioned proposed schemes can be independently implemented or can be implemented in a combined (aggregated) form of a part of the proposed schemes. It may be able to configure an eNB to inform a UE of information on whether to apply the proposed methods (information on rules of the proposed methods) via a predefined signal (e.g., physical layer signal or upper layer signal).

Device Configurations According to Embodiment of the Present Invention

Figure 12:
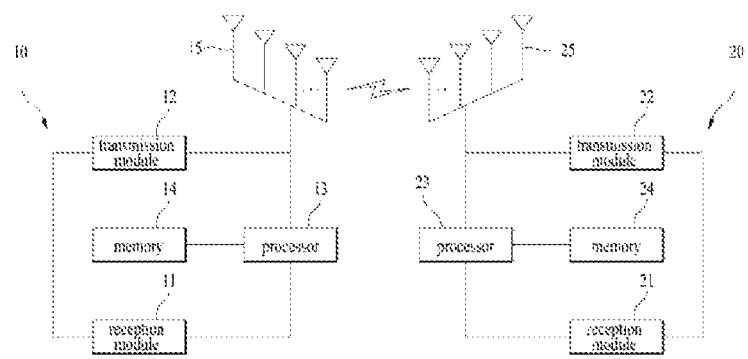
FIG. 12 is a diagram for configurations of a transmitter and a receiver.

FIG. 12 is a diagram for configurations of a transmitter and a receiver.

Referring to FIG. 12, a transmit point apparatus 10 may include a receive module 11, a transmit module 12, a processor 13, a memory 14, and a plurality of antennas 15. The antennas 15 represent the transmit point apparatus that supports MIMO transmission and reception. The receive module 11 may receive various signals, data and information from a UE on an uplink. The transmit module 12 may transmit various signals, data and information to a UE on a downlink. The processor 13 may control overall operation of the transmit point apparatus 10.

The processor 13 of the transmit point apparatus 10 according to one embodiment of the present invention may perform processes necessary for the embodiments described above.

Additionally, the processor 13 of the transmit point apparatus 10 may function to operationally process information received by the transmit point apparatus 10 or information to be transmitted from the transmit point apparatus 10, and the memory 14, which may be replaced with an element such as a buffer (not shown), may store the processed information for a predetermined time.

Referring to FIG. 12, a UE 20 may include a receive module 21, a transmit module 22, a processor 23, a memory 24, and a plurality of antennas 25. The antennas 25 represent the UE that supports MIMO transmission and reception. The receive module 21 may receive various signals, data and information from an eNB on a downlink. The transmit module 22 may transmit various signals, data and information to an eNB on an uplink. The processor 23 may control overall operation of the UE 20.

The processor 23 of the UE 20 according to one embodiment of the present invention may perform processes necessary for the embodiments described above.

Additionally, the processor 23 of the UE 20 may function to operationally process information received by the UE 20 or information to be transmitted from the UE 20, and the memory 24, which may be replaced with an element such as a buffer (not shown), may store the processed information for a predetermined time.

The configurations of the transmit point apparatus and the UE as described above may be implemented such that the above-described embodiments can be independently applied or two or more thereof can be simultaneously applied, and description of redundant parts is omitted for clarity.

Description of the transmit point apparatus 10 in FIG. 14 may be equally applied to a relay as a downlink transmitter or an uplink receiver, and description of the UE 20 may be equally applied to a relay as a downlink receiver or an uplink transmitter.

The embodiments of the present invention may be implemented through various means, for example, hardware, firmware, software, or a combination thereof.

When implemented as hardware, a method according to embodiments of the present invention may be embodied as one or more application specific integrated circuits (ASICs), one or more digital signal processors (DSPs), one or more digital signal processing devices (DSPDs), one or more programmable logic devices (PLDs), one or more field programmable gate arrays (FPGAs), a processor, a controller, a microcontroller, a microprocessor, etc.

When implemented as firmware or software, a method according to embodiments of the present invention may be embodied as a module, a procedure, or a function that performs the functions or operations described above. Software code may be stored in a memory unit and executed by a processor. The memory unit is located at the interior or exterior of the processor and may transmit and receive data to and from the processor via various known means.

Preferred embodiments of the present invention have been described in detail above to allow those skilled in the art to implement and practice the present invention. Although the preferred embodiments of the present invention have been described above, those skilled in the art will appreciate that various modifications and variations can be made in the present invention without departing from the spirit or scope of the invention. For example, those skilled in the art may use a combination of elements set forth in the above-described embodiments. Thus, the present invention is not intended to be limited to the embodiments described herein, but is intended to accord with the widest scope corresponding to the principles and novel features disclosed herein.

The present invention may be carried out in other specific ways than those set forth herein without departing from the spirit and essential characteristics of the present invention. Therefore, the above embodiments should be construed in all aspects as illustrative and not restrictive. The scope of the invention should be determined by the appended claims and their legal equivalents, and all changes coming within the meaning and equivalency range of the appended claims are intended to be embraced therein. The present invention is not intended to be limited to the embodiments described herein, but is intended to accord with the widest scope consistent with the principles and novel features disclosed herein. In addition, claims that are not explicitly cited in each other in the appended claims may be presented in combination as an embodiment of the present invention or included as a new claim by subsequent amendment after the application is filed.

INDUSTRIAL APPLICABILITY

The embodiments of the present invention can be applied to various mobile communication systems.

What is claimed is:

1. A method of transmitting and receiving a signal, which is transmitted and received using a plurality of antennas including a first antenna and a second antenna by a second node in a FDR (full duplex radio) system, comprising:
    transmitting, by the second node, a first signal to a first node using the second antenna while receiving a second signal from the first node using the first antenna;
    when transmission of the first signal to the first node is completed before reception of the second signal from the first node is completed, transmitting, by the second node, Tx/Rx capability information to a third node; and
    receiving, by the second node, a third signal from the third node using the second antenna after the Tx/Rx capability information is transmitted,
    wherein the Tx/Rx capability information is information indicating that the second antenna is switchable to a receive mode for receiving the third signal from the third node.

2. The method of claim 1, wherein the Tx/Rx capability information is transmitted to the third node through signaling requesting a PMI (Pre-coding Matrix Indicator).

3. The method of claim 1, wherein the Tx/Rx capability information is transmitted to the third node through signaling requesting a RI (Rank Indicator).

4. The method of claim 1, wherein signaling for the Tx/Rx capability information is transmitted in a manner of being contained in a CTS (clear to send) frame.

5. The method of claim 1, wherein signaling for the Tx/Rx capability information corresponds to a response for an RTS (request to send) frame received from the third node.

6. The method of claim 1, wherein the Tx/Rx capability information comprises identification information of the third node.

7. A second node using a plurality of antennas including a first antenna and a second antenna in a FDR (full duplex radio) system, comprising:
    a transmitter and a receiver; and
    a processor,
    wherein the processor is configured to:
    transmit a first signal to a first node using the second antenna while receiving a second signal from a first node using the first antenna,
    when transmission of the first signal transmitted to the first node is completed before reception of the second signal from the first node is completed, transmit Tx/Rx capability information to a third node,
    receive a third signal from the third node using the second antenna after the Tx/Rx capability information is transmitted,
    wherein the Tx/Rx capability information is information indicating that the second antenna is switchable to a receive mode for receiving the third signal from the third node.

8. The second node of claim 7, wherein the Tx/Rx capability information is transmitted to the third node through signaling requesting a PMI (Pre-coding Matrix Indicator).

9. The second node of claim 7, wherein the Tx/Rx capability information is transmitted to the third node through signaling requesting a RI (Rank Indicator).

10. The second node of claim 7, wherein signaling for the Tx/Rx capability information is transmitted in a manner of being contained in a CTS (clear to send) frame.

11. The second node of claim 7, wherein signaling for the Tx/Rx capability information corresponds to a response for an RTS (request to send) frame received from the third node.

12. The second node of claim 7, wherein the Tx/Rx capability information comprises identification information of the third node.

* * * * *